Figure 1:
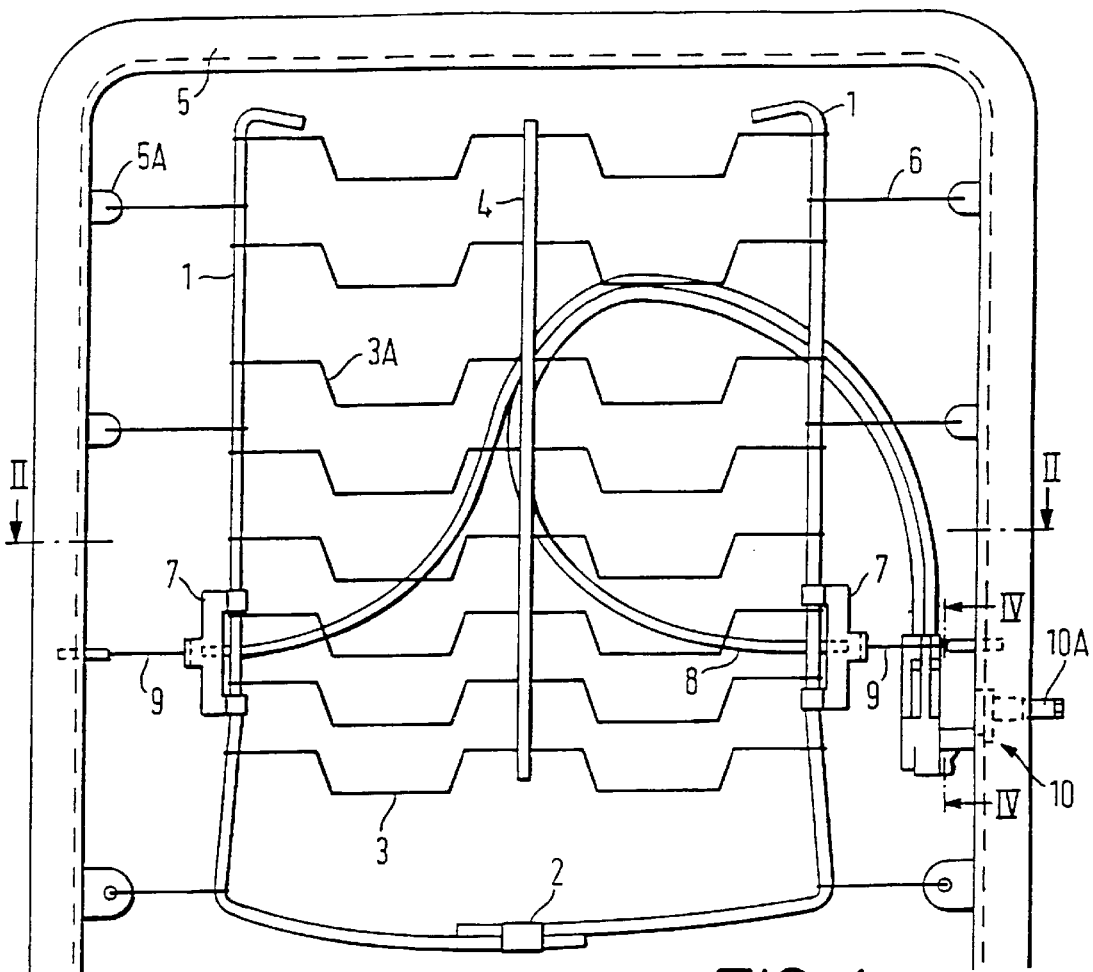

United States Patent [19]
Deceuninck

[11] Patent Number: 6,152,531
[45] Date of Patent: *Nov. 28, 2000

[54] SEAT SUSPENSION ARRANGEMENT AND ADJUSTMENT MECHANISM THEREFORE

[75] Inventor: Stefaan Deceuninck, Menen, Belgium

[73] Assignee: Youngflex AG, Zug, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 09/242,767

[22] PCT Filed: Aug. 20, 1997

[86] PCT No.: PCT/EP97/04580

§ 371 Date: May 11, 1999

§ 102(e) Date: May 11, 1999

[87] PCT Pub. No.: WO98/07590

PCT Pub. Date: Feb. 26, 1998

[30] Foreign Application Priority Data

Aug. 23, 1996 [GB] United Kingdom .................... 9617672

[51] Int. Cl.⁷ ...................................................... A47C 7/14
[52] U.S. Cl. ..................................... 297/284.4; 297/284.1
[58] Field of Search ............................... 297/284.1, 284.4

[56] References Cited

U.S. PATENT DOCUMENTS

| | | | |
|---|---|---|---|
| 4,159,847 | 7/1979 | Arai ...................................... | 297/284.4 |
| 4,309,058 | 1/1982 | Barley . | |
| 4,565,406 | 1/1986 | Suzuki ................................. | 297/284.4 |
| 4,588,172 | 5/1986 | Fourrey et al. ................... | 297/284.4 X |
| 4,627,661 | 12/1986 | Ronnhult et al. ..................... | 297/284.4 |
| 5,197,780 | 3/1993 | Coughlin .............................. | 297/284.7 |
| 5,449,219 | 9/1995 | Hay et al. ............................. | 297/284.4 |
| 5,474,358 | 12/1995 | Maeyaert .......................... | 297/284.4 X |
| 5,697,672 | 12/1997 | Mitchell ............................... | 297/284.4 |
| 5,823,620 | 10/1998 | Le Caz ................................. | 297/284.4 |

FOREIGN PATENT DOCUMENTS

| | | | |
|---|---|---|---|
| 0016557 | 10/1980 | European Pat. Off. . | |
| 0128407 | 7/1987 | European Pat. Off. . | |
| 0158562 | 2/1988 | European Pat. Off. . | |
| 0518830 A1 | 6/1992 | European Pat. Off. . | |
| 0540481 A1 | 9/1992 | European Pat. Off. . | |
| 0582821 A1 | 6/1993 | European Pat. Off. . | |
| 2447168 | 8/1980 | France ............................... | 297/284.4 |
| 2596334 | 3/1986 | France . | |
| 1914154 | 6/1971 | Germany ............................ | 297/284.4 |
| 1536132 | 12/1978 | United Kingdom ............... | 297/284.4 |
| 1545186 | 5/1979 | United Kingdom . | |
| 2285744 | 7/1995 | United Kingdom . | |
| WO 93/21800 | 11/1993 | WIPO . | |

*Primary Examiner*—Peter M. Cuomo
*Assistant Examiner*—Rodney B. White
*Attorney, Agent, or Firm*—Wood, Herron & Evans, LLP

[57] ABSTRACT

A seat arrangement comprises a platform element in the form of a wire grid comprising side rails (1) between which extend a plurality of supporting wires (3) having angled portions (3A) such that the platform element is transversely extensible under load. The side rails (1) are linked to a seat frame (5) by wire links (6) that are subject to a seat frame that are subject to only limited extension so that the rails are (1) are held thereby against substantial displacement from the plane of the frame (5). The rails (1) are also linked to the frame (5) by way of Bowden cables (9) that are anchored to the frame forwardly of the side rails (1) and that can be contracted to draw portions of the side rails (1) forwards between adjacent wire links (6), thus varying the contour of the platform element to provide adjustable lumbar support.

4 Claims, 4 Drawing Sheets

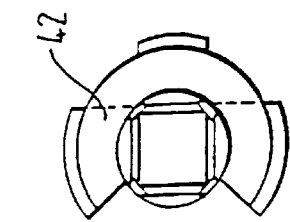
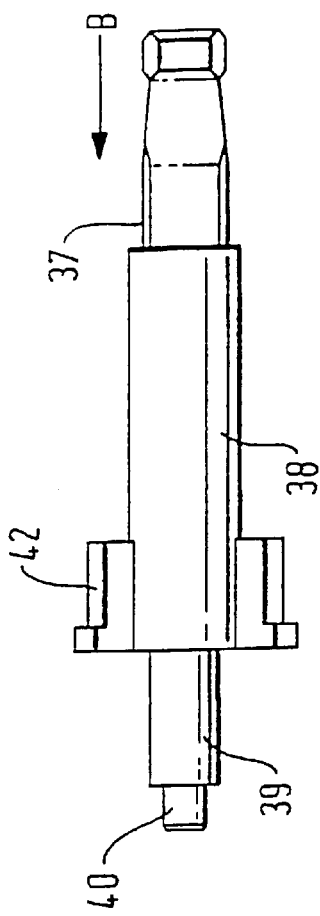
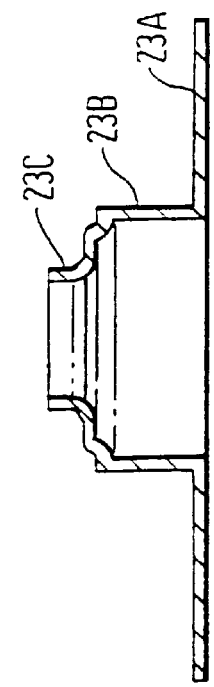
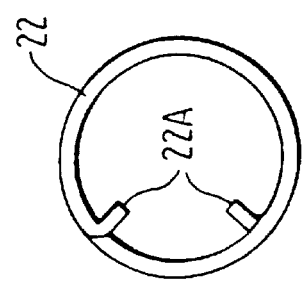

SEAT SUSPENSION ARRANGEMENT AND ADJUSTMENT MECHANISM THEREFORE

This invention concerns an improved seat suspension arrangement of the kind enabling the contour of the support provided by a seat to be adjusted by the user. The arrangement is particularly intended for use in the backrest of a vehicle seat of the kind providing adjustable lumbar support, but it will be appreciated that the principle may be applied to any other arrangement wherein the contour of a seat cushion is desired to be adjusted, for example to a seat base having means for providing adjustable thigh support.

A seat arrangement in accordance with the invention comprises a seat frame and a platform element adapted to provide support for upholstery of the seat, the platform element being linked to the seat frame by link means extending between the frame and at least one margin of the platform element, the said platform element being so constructed that it is resiliently extensible in a direction towards said margin of said seat frame, means being provided for adjusting the effective length of said link means, the arrangement being such that with the link means in an extended condition at least one portion of the platform element is recessed relatively to a boundary of the seat frame forming an attachment for the link means, and said adjustable link means being supplemented by further non-adjustable link means for retaining the position of the margin of said platform element relatively to the seat frame whereby upon contraction of the adjustable link means said portion of the platform element is displaced towards said boundary in order to vary the contour of the said platform element.

Further preferred features and advantages of the invention will become apparent from the following description taken in conjunction with the accompanying drawings and any appended claims.

Figure 1A:

The invention is illustrated by way of example in the accompanying drawings, in which;

FIG. 1 is a front view of a suspension platform for a seat back of a vehicle, shown in place in a vehicle seat frame indicated diagramatically, together with an associated adjusting arrangement, FIG. 1A is a detailed plan view of a link 6 of FIG. 1.

Figure 2:
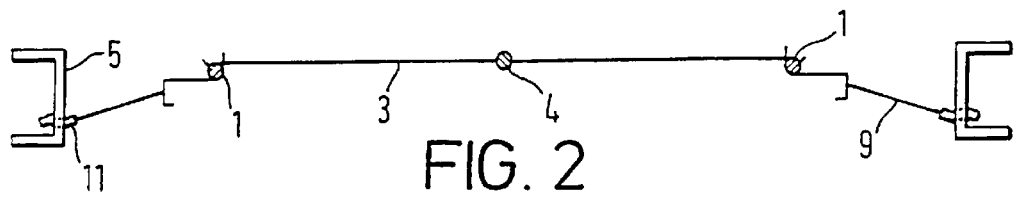
Figure 3:
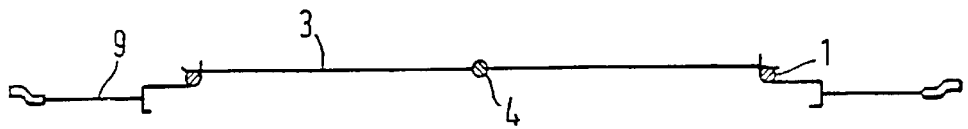
Figure 4:
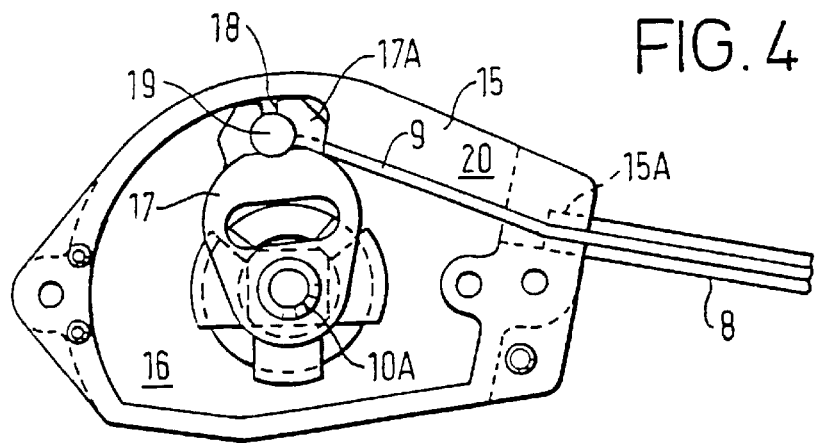
Figure 5:
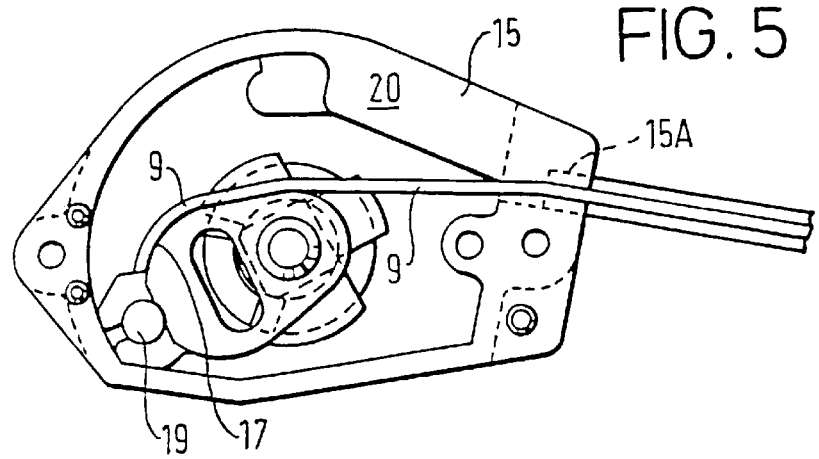
Figure 6:
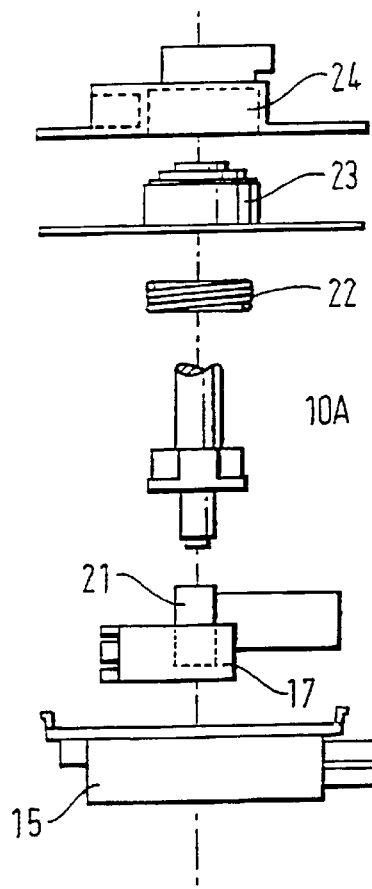

FIG. 2 is a sectional plan view taken on the line II—II of FIG. 1, showing the platform element in one stage of adjustment, FIG. 3 is a view similar to that of FIG. 2 showing the platform element in another state of adjustment, FIG. 4 is a sectional view on the line IV—IV of FIG. 1 showing the internal arrangement of the adjustment mechanism in the position shown in FIG. 2, FIG. 5 is a view similar to that of FIG. 4 but showing the adjustment mechanism in the position corresponding to that of FIG. 3 of the drawings, FIG. 6 is an exploded view showing individual components of the adjusting mechanism of FIGS. 4 and 5, and FIGS. 7A–7C, 8A–8C, 9A–9B, and 10–11 are detailed views of individual components of the assembly shown in FIG. 6.

Referring to FIG. 1, a platform element for supporting the upholstery of a vehicle seat back comprises a pair of side rails 1 formed in known manner of paper wrapped or plastic coated steel wire, the side rails being angled at their lower ends and interconnected by means of a clip 2 to form a U-shaped outer boundary of the platform element.

Between the side rails 1 are provided a plurality of transverse supporting wires 3 that are angled at 3A so that they form sinuous wire springs allowing for limited transverse stretching of the platform element. The longitudinal pitch of the transverse supporting wires 3 is varied in accordance with the desired support to be provided by the platform element, in generally known manner, and the transverse supporting wires 3 are interconnected at their mid points by means of a central longitudinal cord 4 penetrated by the wires 3.

A seat frame is indicated diagramatically at 5 and the platform element is suspended in the seat frame by means of wire links 6 tensioned between the side rails 1 and the seat frame 5. The wire links 6 are also angled to allow limited resilient extension thereof, as shown in FIG. 1A which is a detailed plan view of a link 6 of FIG. 1.

The transverse supporting wires 3 are anchored to the side rails 1 by being wound around the latter in such a manner that they compress the pacer or plastic covering of the side rails and and are thereby retained in their longitudinal spacing. Such an arrangement will be well known to one skilled in the art.

In the region of the platform element that is intended to provide lumbar support for the occupant of the seat, there are attached to the side rails 1 sheet metal brackets 7 that engage around the side rails 1 and also provide an anchorage for the outer sheaths 8 of a pair of Bowden cables coupled to a manually actuatable adjusting mechanism indicated generally at 10 and to be described in more detail below.

The Bowden cables 9 extend from the outer sheaths 8 and pass through the brackets 7, the ends of the cables being linked to the seat frame 5 by anchor portions 11.

The seat frame 5 is of channel section as shown more clearly in FIG. 2, and, whereas the links 6 extend in the plane of the platform element and are coupled to tabs 5A at the rear of the frame 5, the anchor portions 11 are coupled to the front of the frame 5 so that, when the adjusting mechanism 10 is in one end position of adjustment, the position of the platform element relatively to the seat frame, in the region that is linked to the Bowden cables 9, is substantially as shown in FIG. 2, in which the support provided by the platform element extends in a configuration that is generally concave relatively to the margins of the seat frame 5.

In this position, the portions of the Bowden cables 9 extending between the seat frame 5 and the brackets 7 act effectively as wire links determining the positions of the adjacent portions of the side rails 1 relatively to the seat frame 5. Thus, by actuating the adjustment mechanism 10, for example by means of a manually actuatable lever connected to the end of rotary shaft 10A, the Bowden cables can be retracted relatively to the brackets 7, thus shortening the links coupling the side rails 1 to the frame 5 at this point.

As a result, the platform element can be tensioned forwardly until the portions of the side rails 1 adjacent the brackets 7 adopt a position relatively to the frame 5 that is shown in FIG. 3. It will be appreciated that since the wire links 6 are subject only to limited extension, in comparison for example to coil springs, tensioning of the Bowden cables caused change in the contour of the platform element rather than displacement thereof as a whole.

Thus, the degree of lumbar support provided by the platform element can be increased by actuation of the mechanism 10.

This arrangement has the considerable advantage in comparison with known means for providing adjustable lumbar support, that the overall position of the platform element is not displaced relatively to the seat frame. In known arrangments, wherein the profile of the platform element is varied to provide lumbar adjustment, the disadvantage can arise that when the platform element is angled to increase lumbar support the suspension means yield to allow the platform element to move rearwardly thus reducing the effectiveness of the lumbar adjustment.

FIGS. 2 and 3 show the two extreme positions of the lumbar adjustment provided in the embodiment described, and it will be appreciated that in contracting the Bowden cables 9 in order to achieve movement of the adjacent portions of the side rails 1 from the position of FIG. 2 to the position of FIG. 3, the tension in the Bowden cables progressively increases, so that the force that must be exerted by the adjusting mechanism varies accordingly. This effect has also been found to occur in other forms of seat adjustment that have hitherto been effected by means of Bowden cables, and thus there is a requirement for a novel Bowden cable actuating mechanism that can accommodate the varying force to be exerted thereon. An actuating mechanism that achieves this object will now be described.

Referring to FIGS. 4 and 5, the mechanism 10 is provided with an outer housing 15 incorporating recesses 15A for the receipt of the sheaths 9 of the Bowden cables 9. The aforementioned shaft 10A extends within a recess 16 in the housing 15 and carries a cam element 17 that can be turned by means of the shaft 10A and has at an extremity thereof anchor points 18 for receiving terminal portions 19 provided at the ends of the Bowden cables 9.

FIG. 4 shows the position of the cam element 17 when the arrangement is in the position of adjustment shown in FIG. 2, and a shoulder 17A of the cam element is in abutment with an end stop provided by a web portion 20 of the housing 15.

In order to adjust the system from the positon of FIG. 2 towards the position of FIG. 3, the shaft 10A is turned in an anticlockwise direction as viewed in FIG. 4. Initially, the end of the Bowden cable 9 tensioned by the cam element 17 is at a maximum radius from the central axis of the shaft 10A, and thus rotation of the shaft produces the maximum effective longitudinal movement of the cable 9 with a relatively low mechanical advantage. As the shaft 10A turns clockwise, however, it will be seen that the cable 9 is wound onto the surface 17B of the cam 17 so that the radial distance of the cable 9 from the axis of the shaft 10A progressively reduces with the anticlockwise movement of the cam element 17 until, in the end position shown in FIG. 5, the radial distance of the cable 9 from the centre of the shaft 10A is at a minimum, and the mechanical transmission between the shaft 10A and the cable 9 reduces the maximum mechanical advantage to facilitate tensioning of the cable by the manual actuating mechanism.

The components of the actuating mechanism 10 are shown in more detail in the exploded view of the FIG. 6, wherein there are shown the housing 15, the cam element 17, the shaft 10A, a connecting peg 21, a helical spring 22, a clutch housing 23 and an end cover 24.

Figure 7B:
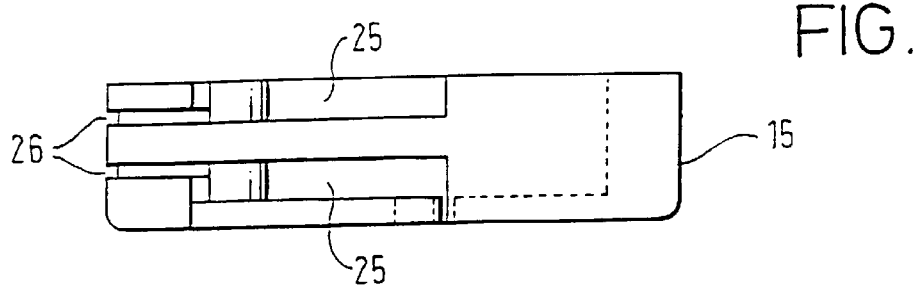
Figure 7A:
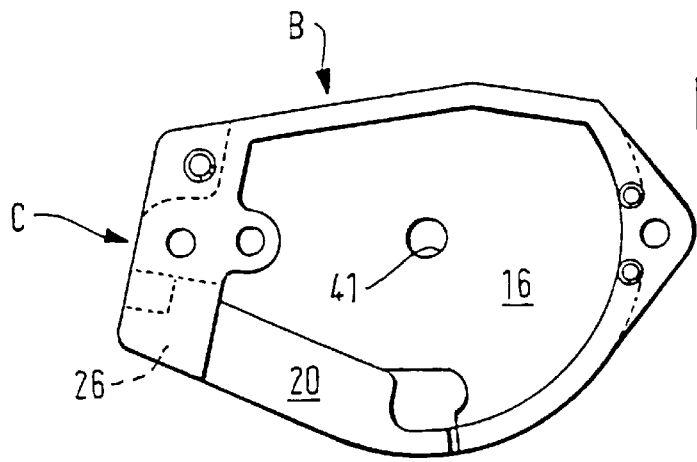
Figure 7C:
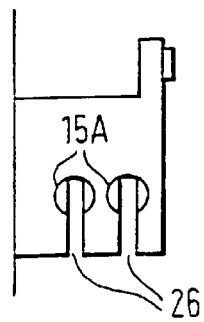

The housing 15 is shown in more detail in FIG. 7, wherein FIG. 7A shows a view of the housing similar to that of FIGS. 4 and 5, FIG. 7B shows a side view from the direction of the arrow B of FIG. 7, and FIG. 7C shows a side view from the direction of the arrow C of FIG. 7A. As seen from FIG. 7B, the side wall of the housing 15 has pair of radial slots 25 providing access to the internal recess 16, between which slots is defined the web 20 referred to above. As shown in FIG. 7B and 7C, the recesses 15A for the cable sheaths 8 are connected via slots 26 to the slots 25, thus enabling insertion of the terminal portions 19 of the Bowden cables 9 via the slots 26 and 25 into the recess 16 containing the cam element 17.

Figure 8A:
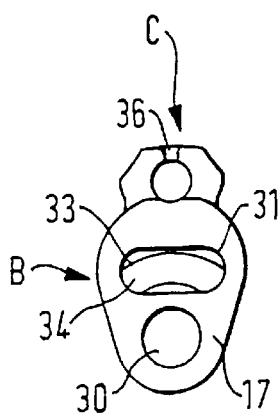
Figure 8B:
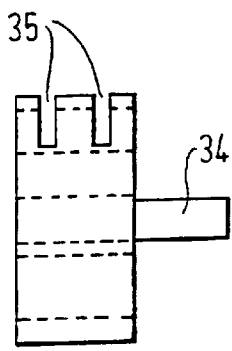
Figure 8C:
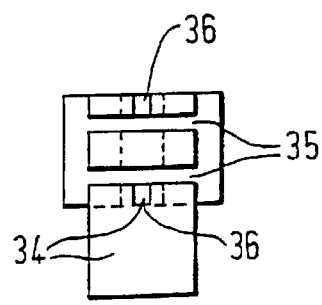

The cam element 17 is shown in more detail in FIG. 8, wherein FIG. 8A is a view of the cam element from the direction seen in FIGS. 4 and 5, shown with the peg 21 in place therein, FIG. 8B is a view in the direction of the arrow B of FIG. 8A and FIG. 8C is a view in the direction of the arrow C of FIG. 8A.

As seen in FIG. 8A, the cam element 17 has a bore 30, an aperture 31 of generally oval shape extending along an axis parallel to the bore 30, and a further bore 32 also extending on an axis parallel to the bore 30.

The peg 21 has a portion 33 fitting within the aperture 31 and a portion 34 that extends axially from the cam element 17 and has an arcuate shape as shown in FIG. 8A.

The cam element 17 has a pair of radial slots 35 and a pair of axially extending slots 36 for receiving the cables 9 attached to terminal portions 19 as the latter are inserted into the bore 32 via which they are anchored to the cam element 17.

The shaft 10A is shown in FIG. 9, wherein FIG. 9A is an axial plan view of the shaft and FIG. 9B is an end view of the shaft taken in the direction of the arrow B of FIG. 9.

The shaft 10A has a squared end 37 for receiving the actuating lever referred to above, a main cylindrical portion 38, a further cylindrical portion 39 of reduced diameter, to fit the bore 30 of the cam element 17, and a stub portion 40 of further reduced diameter, for engagement within a bore 41 (FIG. 7A) of the housing 15. The cylindrical portion 38 carries a stepped shoulder 42 of part circular configuration as can be seen from FIG. 9B. The shoulder 42 serves the dual purpose of embracing the axially extending portion 34 of the peg 21 by which movement is transmitted to the cam element 17, and supporting the helical spring 22 that is received in the clutch housing 23. The shoulder portion 42, the spring 22 and the clutch housing 23 cooperate to form a friction clutch retaining the cam element 17 in any set position, as will be described below.

As shown in FIG. 10, the helical spring 22 has inturned ends 22A that engage within the arcuate recess defined by shoulder 42, the spring fitting loosely around the reduced diameter portion of the shoulder 42 and being retained axially by the portion of greater diameter.

The clutch housing 23 is shown in transverse section in FIG. 11, wherein the part 23A comprises a base plate for assembly to the housing 15, the part 23B comprises a cylindrical shell for receiving the helical spring 22 as a friction fit therein, and the part 23C comprises a reduced diameter bush for receiving and supporting the cylindrical portion 38 of the shaft 10A.

With the actuating mechanism in the assembled condition, the spring 22 is a tight friction fit within the clutch housing 23, and the portion 34 of the peg 21 extends axially with a certain degree of lost motion within the arcuate recess of the shoulder 42 and between the ends 22A of the spring 22. Thus, with the spring 22 tightly engaged within the clutch housing 23, the two ends 22A of the spring form end stops limiting the movement of the peg 21 and thus the cam element 17. When it is desired to move the cam element 17 to another position, the shaft 10A is turned by means of the lever referred to above, and one of the two ends 22A of the spring 22 is thus engaged by a corresponding radial edge of the shoulder 42. The spring 22 thus becomes wound up upon itself, whereby its diameter is reduced sufficiently to enable it to be rotated within the clutch housing 22, that end 22A of the spring that is engaged between the shoulder 42 and the peg 21 serving to transmit rotary movement to the peg 21 and thus to the cam element 17. Upon release of the lever attached to the shaft 10A the spring 22 is allowed to relax and expand into tight frictional engagement with the clutch housing 23, thereby retaining the cam element 17 in its new position.

Thus it will be seen that the actuating mechanism 10, combines the functions of a simple and effective friction clutch and Bowden cable actuating mechanism the mechanical advantage of which is varied to compensate for changing forces occurring during adjustment of the lumbar support provided by the arrangement of FIGS. 1–3.

I claim:

1. A seat suspension arrangement comprising:

a seat frame (5) having a front and a rear and a platform element suspended in the seat frame to provide support for upholstery of the seat, said platform element comprising a pair of spaced side rails (1) between which extend a plurality of transverse supporting wires (3), said supporting wires (3) incorporating angled portions (3A) which enable the platform element to extend resiliently relative to said seat frame and to provide resilient support for the upholstery;

said side rails (1) each being coupled to the seat frame by links (6) which are spaced apart along said side rails (1);

characterized in that the links couple the side rails to the rear of the seat frame and in that a portion of each of said side rails (1) is further coupled to the front of said seat frame (5) at a point between adjacent links (6) by adjustable links (9) extending between the seat frame and the side rails a mechanism (10) is coupled to the adjustable links for adjusting an effective length of the adjustable links between the seat frame and the side rails such that when said adjustable links (9) are in non-contracted conditions, the portions of the side rails (1) coupled thereto are proximate the rear of the frame and are rearwardly spaced from the front of the seat frame (5), and whereby upon contraction of the length of said adjustable links (9), the side portions of said side rails (1) are drawn by the adjustable links from proximate the rear of the frame towards the front of the frame in order to vary a contour of the platform element.

2. A seat suspension arrangement as claimed in claim 1, wherein said seat frame (5) comprises a backrest portion, said platform element being supported from opposite sides of the backrest portion of the frame (5) by said links (6) and said adjustable links (9) being provided in a region of the platform element for providing a lumbar support, whereby said variation in the contour of the platform element is such as to adjust the lumbar support.

3. A seat suspension arrangement as claimed in claim 1 or 2, wherein the adjustable links comprise Bowden cables (9) extending between the seat frame (5) and said side rails (1) and said mechanism for adjusting the effective length of the adjustable links (9) comprises an actuating mechanism (10) for manipulating the Bowden cables (9).

4. A seat suspension arrangement as claimed in claim 3 wherein each Bowden cable (9) is coupled to a side rail (1) by means of a bracket (7) linked to the side rail (1) the bracket providing a ferrule for an outer sheath (8) of the Bowden cable.

* * * * *

UNITED STATES PATENT AND TRADEMARK OFFICE
CERTIFICATE OF CORRECTION

PATENT NO. : 6,152,531
DATED : November 28, 2000
INVENTOR(S) : Stefaan Deceuninck It is certified that error appears in the above-identified patent and that said Letters Patent is hereby corrected as shown below:

Column 2,
Line 16, delete "pacer", and insert -- paper --.

Column 3,
Line 19, delete "sheaths 9", and insert -- sheaths 8 --.

Column 6, claim 1,
Line 6, insert after "(1)" -- and a portion of the platform element --.

Signed and Sealed this

Eighteenth Day of September, 2001

Attest:

NICHOLAS P. GODICI
*Attesting Officer*     *Acting Director of the United States Patent and Trademark Office*